United States Patent Office  3,246,043
Patented Apr. 12, 1966

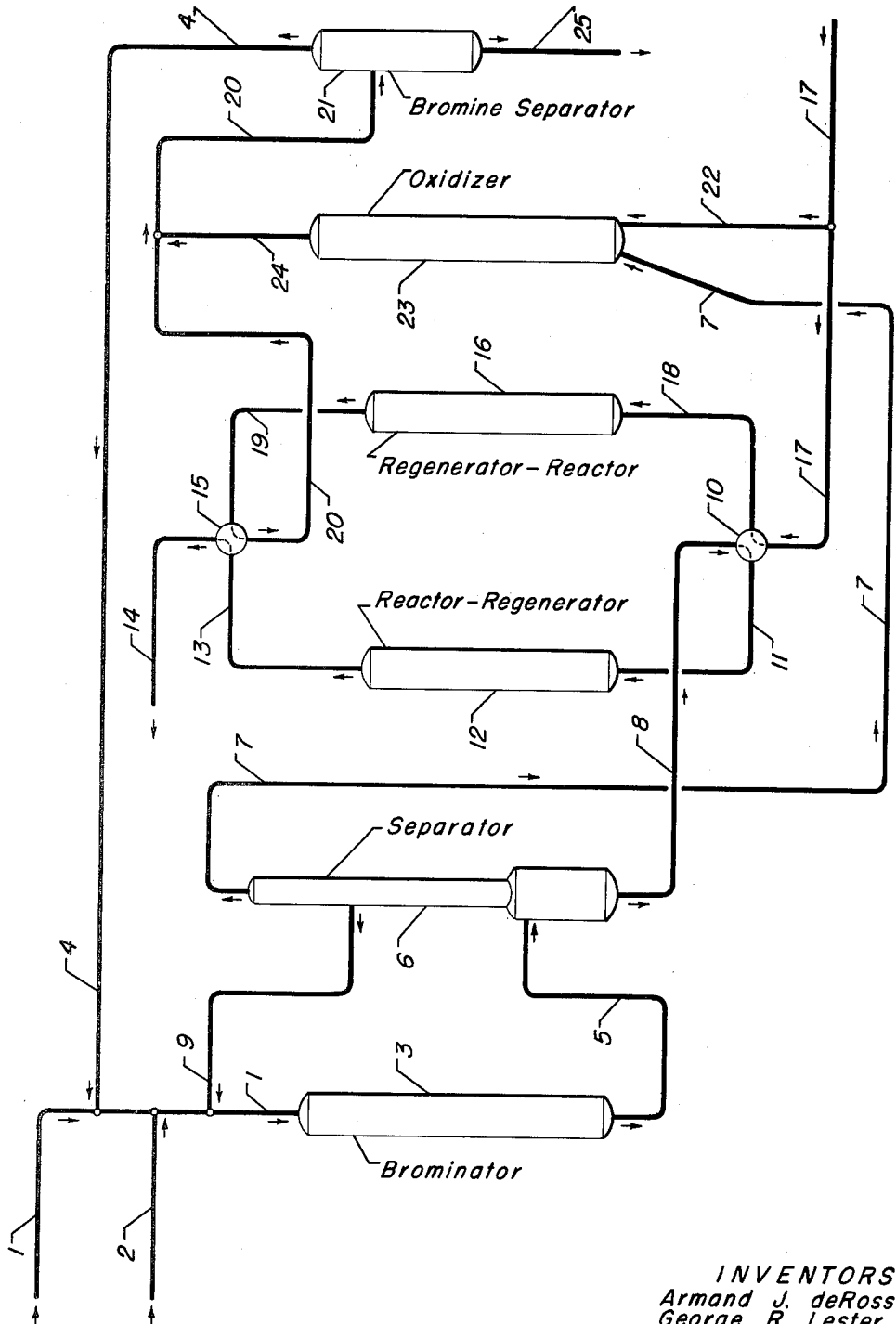

3,246,043
PREPARATION OF OLEFINIC HYDROCARBONS
Armand J. de Rosset, Clarendon Hills, and George R. Lester, Mount Prospect, Ill., assignors to Universal Oil Products Company, Des Plaines, Ill., a corporation of Delaware
Filed Dec. 12, 1962, Ser. No. 244,136
12 Claims. (Cl. 260—666)

This invention relates to the preparation of an olefinic hydrocarbon from a more saturated hydrocarbon of the same carbon configuration as the desired olefinic hydrocarbon. More particularly, this invention relates to a continuous process for the preparation of said olefinic hydrocarbon involving bromination of the aforesaid more saturated hydrocarbon, dehydrobromination of the bromination product, and recovery and recycle of bromine for use in the said bromination. The products of the process of this invention may be utilized in polymerization and alkylation reactions to yield a variety of important materials. For example, isobutene, a product of the process of this invention, is alkylated with isobutane to obtain the commercially important isooctane.

Dehydrogenation of hydrocarbons via thermal or catalytic methods is a considerably endothermic process requiring the application of a substantial amount of heat. In many cases, the excessive temperatures result in undesirable side reactions, poor product distribution, and carbon formation. The inclusion of a hydrogen acceptor in the dehydrogenation process radically alters the nature thereof from an endothermic to an exothermic process. It is well known in the art to utilize chlorine as a hydrogen acceptor. For example, chlorination of an alkyl hydrocarbon to form an alkyl chloride and hydrogen chloride and the subsequent dehydrochlorination of said alkyl chloride to form the desired olefin and additional hydrogen chloride, is readily accomplished. However, recovery of the chlorine, for recycle purposes or otherwise, is not as readily accomplished and its utilization, particularly in large scale commercial operations, is, as a result, not conducive to efficient production of olefinic hydrocarbons.

It is an object of this invention to present an improved and continuous process for the preparation of an olefinic hydrocarbon from a more saturated hydrocarbon of the same carbon configuration as the desired olefinic hydrocarbon, utilizing bromine as a hydrogen acceptor, which process involves the bromination of said more saturated hydrocarbon, dehydrobromination of the brominated derivative thereof, and in particular the recovery of substantially all of the bromine.

It is a further object to present a novel method of dehydrobrominating a brominated hydrocarbon and recovering an olefinic hydrocarbon and free bromine.

In one of its broad aspects the present invention embodies a method of preparing an olefinic hydrocarbon from a more saturated hydrocarbon of the same carbon configuration, which method comprises reacting bromine with said more saturated hydrocarbon and forming a bromination product comprising a bromine derivative thereof, dehydrobrominating the bromination product at an elevated temperature in contact with a solid sorbent material comprising an oxide of a metal selected from the group consisting of calcium, magnesium, and zinc, and forming bromine combined with said sorbent material and an olefinic hydrocarbon, recovering the olefinic hydrocarbon and re-forming bromine from the bromine combined with said sorbent material by contacting the same with an oxygen-containing gas at conditions effecting the oxidation of combined bromine.

Another embodiment of this invention is in a method of dehydrobrominating a brominated hydrocarbon and recovering free bromine, which method comprises contacting said brominated hydrocarbon with a solid sorbent material at a temperature of from about 50° C. to about 550° C., said sorbent material comprising an oxide of a metal selected from the group consisting of calcium, magnesium, and zinc, and further comprising from about 0.1 wt. percent to about 15 wt. percent of a metal selected from the group consisting of copper, cerium, iron, nickel, and cobalt, forming bromine combined with said solid sorbent material and an olefinic hydrocarbon, separating said olefinic hydrocarbon and forming bromine from the bromine combined with said sorbent material by contacting the same with an oxygen-containing gas at a temperature of from about 50° C. to about 550° C.

Further objects and embodiments of the present invention will become apparent in the following detailed specification.

In accordance with the method of this invention for the preparation of an olefinic hydrocarbon, bromine is first reacted with a more saturated hydrocarbon of the same carbon configuration as the desired olefinic hydrocarbon. Thus bromine is initially reacted with ethane when the desired end product is ethylene, or propane when the desired end product is propylene, or butane when the desired end product is butene, and either butane or butene when the desired end product is butadiene. Other hydrocarbons which can be treated in accordance with the present method to prepare an olefinic hydrocarbon of the same carbon configuration include pentane, hexane, heptane, octane, nonane, decane, etc., and also isobutane, isopentane, 2,3-dimethylbutane, 2-methylpentane, 3-methylpentane, 2,3-dimethylpentane, 2,4-dimethylpentane, 2-methylhexane, 3-methylhexane, 2,3-dimethylhexane, 2,4-dimethylhexane, etc. Cycloparaffins including cyclobutane, cyclopentane, methylcyclopentane, cyclohexane, methylcyclohexane, and the like, can also be converted to an olefinic hydrocarbon of like carbon configuration by the method of this invention.

Monoolefins, and preferably non-terminal monoolefins, can be treated in accordance with the method of this invention to yield a diolefin product. Suitable monoolefins include 2-butene, 2-methyl-2-butene, 2,3-dimethyl-2-butene, 2-pentene, 2-methyl-2-pentene, 3-methyl-2-pentene, 2,3 - dimethyl - 2-pentene, 2-hexene, 3-hexene, 2-methyl - 2 - hexene, 2,3-dimethyl-2-hexene, 3-methyl-3-hexene, 3,4-dimethyl-3-hexene, etc., and also cycloolefins such as cyclopentene, cyclohexene, and the like. In general, olefinic hydrocarbons may be prepared in accordance with the present method from more saturated hydrocarbons of the same carbon configuration and containing up to about 20 carbon atoms.

One of the preferred embodiments of this invention relates to a method of preparing propylene from propane and the further description of the method of this invention is in relation thereto and with reference to the attached schematic flow diagram.

Referring to the schematic flow diagram, the selected hydrocarbon starting material, which in this instance is propane, is charged through line 1 and enters a brominator 3 admixed with bromine. Said bromine is principally recycle bromine, formed in the manner hereinafter described and recycled to the brominator through line 4, with make-up bromine being introduced to the process through line 2. The bromine may be diluted with nitrogen, or other inert gas, as desired. The hydrocarbon starting material is generally charged to the brominator in excess of stoichiometric amounts, which excess may be as much as 20 moles per mole of bromine. However, it is generally preferred to utilize a smaller ratio. For example, in the bromination of propane, propane and bromine were charged to the brominator in a mol ratio of about 10 to 1, the desired bromination product being a monobromopropane. When the desired bromination product is a dibromide, as is the case where the desired olefinic hydrocarbon is a diolefin, and the starting material is a saturated hydrocarbon such as butane, or a monoolefin such as 2-methyl-2-butene, the mole ratio is further reduced to from about 5 to 1 to about 1 to 1. Of course, dibromides may also be obtained by recycle of a monobromo bromination product, or by utilization of a monoolefinic starting material as above indicated.

Although it may be desirable in some instances to employ superatmospheric pressures, for example, to effect a process flow, pressure is not considered to be an important variable with respect to the bromination process, or with respect to subsequent reactions of the process of this invention. Nor is it necessary that pressure be regulated to control the physical state of the reactants as they can be processed in either the liquid or gaseous phase. Thus, the pressure may be simply autogenous pressure developed during the course of the reaction, or a pressure selected on purely economic considerations and in regard to the stability of the particular reactants to be processed. In the present case, propane was brominated in the vapor phase at substantially atmospheric pressure.

The hydrocarbon is charged to the brominator in admixture with the bromine at a rate which will insure substantially complete reaction of the bromine admixed therewith. Completion of the reaction may be determined by observation of the brominator effluent stream, a colorless stream indicating complete reaction of the bromine. In the present example, wherein propane and bromine were charged in a 10 to 1 mol ratio, substantially complete reaction of the bromine was achieved at a gaseous hourly space velocity of about 1000 at a temperature of about 300° C. The residence time, measured in terms of liquid or gaseous hourly space velocity, is in general relatively brief, ranging from about 500 to about 2500 in the case of gaseous hourly space velocity. The optimum residence time in any particular case is in part dependent on the temperature utilized. Other factors include the mol ratio of the reactants, the hydrocarbon starting material to be brominated, and the nature of the desired product.

The bromination can be effected at a temperature of from about 0° C. to about 400° C. The temperature utilized at any given case is dependent upon the particular hydrocarbon to be brominated. For example, paraffins containing a tertiary carbon atom are more readily brominated than the normal or cycloparaffins and require lower temperatures, say from about 0° C. to about 250° C. Olefins are also readily brominated at a reduced temperature which may be from about 0° C. to about 200° C. The catalytic effect of light on bromination reactions of the type herein contemplated is of course well known.

The brominator may comprise an unpacked vessel, or it may be suitably packed with a particulate solid material to effect a better heat distribution, intermingling of the reactants, etc. The particulate solid material may be an inert material such as porcelain rings, glass chips, or beads, or it may be catalytically active such as copper oxide or platinum on alumina. An unpacked column was utilized in the present example wherein propane was brominated at a temperature of about 300° C.

After a suitable residence time, the bromination reaction mixture is withdrawn from the brominator and passed to a separator 6 by way of line 5. The reaction mixture comprising unreacted hydrocarbon, hydrogen bromide, and the desired bromination product, is separated into its component parts by fractional distillation in said separator 6. Any hydrogen bromide which may have been formed in the bromination reaction is distilled overhead and conducted through line 7 to an oxidizer 23 hereinafter described. The desired bromination product is withdrawn from the separator through line 8 as the lower boiling fraction of the bromination reaction mixture. The excess hydrocarbon, charged to the brominator in the first instance, is recovered from the separator as an intermediate cut by means of a take-off line 9 and recycled to the aforesaid brominator.

The schematic flow diagram shows passage of the bromination product through a 4-way selector valve 10 and line 11 to a reactor-regenerator 12. As illustrated, the reactor-regenerator is functioning as a dehydrobromination reactor and regenerator-reactor 16 is functioning as a regenerator, said reactor-regenerator and regenerator-reactor being twin vessels of a swing reactor system. It should of course be recognized that the function of the vessels is periodically reversed through manipulation of the four-way selector valves 10 and 15 to effect a continuous type of reaction.

The reactor-regenerator and the regenerator-reactor are packed vessels, said packing comprising a solid sorbent material in a particulate form. The solid sorbent material is preferably an oxide of a metal selected from the group consisting of calcium, zinc, and magnesium, particularly the latter. At least a portion of the above oxides exists in the form of a hydrate thereof, or a hydroxide, at dehydrobromination reaction conditions and oxides are herein intended to include such hydrates, or hydroxides.

The selected solid sorbent material further comprises from about 0.1 wt. percent to about 15 wt. percent, and preferably from about 1 wt. percent to 5 wt. percent of a metal selected from the group consisting of copper, cerium, iron, nickel, and cobalt. In a preferred embodiment the solid sorbent material is magnesia containing from about 1 wt. percent to about 5 wt. percent copper. The use of copper, cerium, iron, nickel, or cobalt in excess of the stated amounts is to be avoided as it tends to oxidize the hydrogen bromide on the contact therewith to form free bromine which in turn tends to add to the olefinic hydrocarbon product.

The bromination product charged to the reactor-regenerator 12 is shown passing upwardly therethrough. The bromination product, which in the present illustrative example is propyl bromide, is dehydrobrominated in contact with the solid sorbent material, forming bromine combined with said solid sorbent material and an olefinic hydrocarbon, in the present case propylene. The exact nature of the combined bromine is not known. It may be that the combined bromine exists as hydrogen bromide sorbed on the solid sorbent material in physical and/or chemical combination therewith. On the other hand, the combined bromine may exist as a bromide of the solid sorbent material, for example, magnesium bromide. It is contemplated that the nature of the combined bromine is a combination of the above forms. However, it is not intended to limit the process of the present invention to any particular theory as to the nature of the combined bromine.

The method of this invention, with relation to dehydrobromination, presents a number of advantages. For example, the combined bromine resulting from the dehydrobromination step is readily and simply separated from the olefin product. Also, said combined bromine is bound in chemical and/or physical association with the solid sorbent material in preference to recombination or reaction with the olefin product during the dehydrobromination reaction. Furthermore, bromine, combined with the solid sorbent materials herein disclosed, is readily and substantially completely recoverable in the elemental state for recycle purposes or otherwise.

Dehydrobromination is generally carried out at an elevated temperature which may be from about 50° C. to about 550° C. Temperatures in the higher range, from about 200° C. to about 550° C., are employed when the bromination product is a dibromide, as is generally the case, for example, where the hydrocarbon brominated was an olefin. Temperatures in the lower range of from about 50° C. to about 400° C. are suitable when the bromination product is a monobromide. The propyl bromide of the present example, formed in the aforementioned bromination step, was processed over granular magnesia containing 5 wt. percent copper at a temperature of about 300° C. and at a liquid hourly space velocity of about 1.2. The olefinic hydrocarbon (propylene in this case) is withdrawn overhead through line 13 and channeled through a 4-way valve 15 to a caustic scrubber (not shown) to remove any entrained hydrogen bromide, and thereafter discharged to recovery through line 14. Dehydrobromination of propyl bromide in the present example resulted in a 97–100% conversion to propylene.

As previously mentioned, the schematic flow diagram shows the regenerator-reactor 16 of the swing-reactor system functioning in its capaicty as a regenerator. Elemental bromine is re-formed from the bromine combined with the solid sorbent material at conditions effecting the oxidation of combined bromine. Substantially complete oxidation of the combined bromine to free bromine and water is effected at a temperature of from about 50° C. to about 550° C., and preferably at a temperature of from about 50° C. to about 400° C. The oxidation is effected in the presence of air, or other oxygen-containing gas, admitted to the system through line 17 and the 4-way selector valve 10, passing to the regenerator-reactor by way of line 18. The bromine and water oxidation products exit from the regenerator-reactor through line 19, passing through the 4-way selector valve 15 and through line 20 to a bromine separator 21.

Hydrogen bromide, previously withdrawn from the aforementioned separator 6 through line 7, is charged to an oxidizer 23. Bromine is re-formed from said hydrogen bromide by contacting the same with air introduced from line 22, or other oxygen-containing gas, at conditions effecting the oxidation of combined bromine—generally a temperature of from about 50° C. to about 550° C., preferably from about 50° C. to about 400° C.—forming free bromine and water. The oxidation of hydrogen bromide to free bromine and water can be effected with or without the aid of a catalyst. When it is desired to employ a catalyst, a compound of a multi-valent metal such as copper, cerium, iron, nickel, cobalt, etc., usually an oxide, halide, or the like, or other conventional Deacon type catalyst is suitable.

The bromine and water oxidation products are withdrawn from the oxidizer through line 24 and passed to the bromine separator 21 through line 20 in combination with the bromine and water oxidation products from the regenerator-reactor 16. The bromine is distilled from the water in said bromine separator, the water being discharged from the bottom thereof by means of an outlet 25. The bromine is distilled overhead, and recycled through line 4 to the aforementioned brominator 3 in combination with make-up bromine from line 2.

The foregoing description of the process of this invention illustrates schematically one preferred method of operation. It is understood that many modifications and variations may be made thereto without departing from the generally broad scope of this invention as set out in the appended claims.

*Example I*

Cyclohexane and bromine were charged to a packed reactor (100 cc. of porcelain rings) in a 10:1 mol ratio. The cyclohexane was charged to the reactor at a rate of about 100 cc. per hour, and bromine was charged at the rate of about 2265 cc. per hour in admixture with nitrogen charged at the rate of about 6240 cc. per hour (standard conditions of temperature and pressure). Bromination was effected at a temperature ranging from 170° C. to 280° C. and at a pressure of about 1 atm. The effluent stream, continuously withdrawn from the reactor and caustic scrubbed, was analyzed by gas-liquid chromatography methods and found to contain about 90% unreacted cyclohexane and about 10% cyclohexyl bromide for a conversion of about 100% based on the bromine charged.

The cyclohexyl bromide, separated from the unreacted cyclohexane, was charged to a second reactor containing therein about 50 cc. of a solid sorbent material comprising 5% copper, as copper oxide, on magnesia. The cyclohexyl bromide was charged at a liquid hourly space velocity of about 0.8 and dehydrobromination was effected at a temperature of 150–240° C. The conversion of cyclohexyl bromide to cyclohexene varied from 98.6% to 100%.

Before the combined bromine capacity of the sorbent material was exceeded, the charge flow was stopped and bromine was regenerated by passing air over the bromine combined with said sorbent material at 300° C. Essentially quantitative recovery of bromine was effected.

*Example II*

Bromination of n-butane to yield dibromobutanes is effected on charging n-butane, admixed with bromine in about a 5:1 mol ratio, through a packed reactor at a temperature of about 300° C. and at a gaseous hourly space velocity of about 1000.

The dibromobutanes are separated from the hydrogen bromide and unreacted butane in the reactor effluent, and dehydrobrominated on charging the same at a liquid hourly space velocity of about 1.0 to a reactor maintained at about 200° C. and containing about 50 cc. of a solid sorbent material comprising 5% copper, as copper oxide, on magnesia. A substantial conversion of the dibromobutanes to butadiene is effected.

Before the hydrogen bromide capacity of the sorbent material is exceeded, the charge flow is stopped and bromine regenerated by passing air over the bromine combined with said sorbent material at about 300° C. Essentially quantitative recovery of bromine is effected.

*Example III*

Bromine is added to an equimolar amount of isopentene (2-methyl-2-butene) in a stirred reactor. Bromination is effected at a temperature of about 10° C. The bromination product comprising 2,3-dibromo-2-methylbutane is charged to a second reactor containing about 50 cc. of a solid sorbent material comprising 5% copper, as copper oxide, on magnesia. The dibromide is charged at a liquid hourly space velocity of about 1.0 and dehydrobromination is effected at a temperature of about 325° C. Isoprene is recovered as the dehydrobromination product.

Before the hydrogen bromide capacity of the sorbent material is exceeded, the charge flow is stopped and bromine regenerated by passing air over the bromine combined with said sorbent material at about 300° C. Essentially quantitative recovery of bromine is effected.

*Example IV*

Bromination of propane to yield a bromopropane is effected on charging propane admixed with bromine in about a 10:1 mol ratio, to a packed reactor at a temperature of about 300° C. and at a gaseous hourly space velocity of about 1000. The bromopropane is separated from the hydrogen bromide and unreacted propane in the reactor effluent, and dehydrobrominated on charging the same at a liquid hourly space velocity of about 1.0 to a reactor maintained at about 300° C. and containing about 50 cc. of a solid sorbent material comprising about 5% cerium on zinc oxide. Substantially complete conversion of the bromopropane to propylene is effected.

Before the hydrogen bromide capacity of the sorbent material is exceeded, the charge flow is stopped and bromine regenerated by passing air over the bromine combined with said sorbent material at 300° C. Essentially quantitative recovery of bromine is effected.

*Example V*

Isobutane and bromine are charged to a packed reactor in a mol ratio of about 10:1. The isobutane is charged to the reactor at a rate of about 50 cc. per hour, and bromine is charged at a rate of about 2265 cc. per hour in admixture with nitrogen charged at a rate of about 6240 cc. per hour (STP). Bromination is effected at a temperature of about 300° C. The effluent stream, caustic scrubbed, comprises unreacted isobutane and isobutyl bromide. The bromide, separated from the isobutane, is charged to a second reactor containing about 50 cc. of a solid sorbent material comprising 5% copper, as copper oxide, on magnesia. The bromide is charged at a liquid hourly space velocity of about 1.0 and dehydrobromination is effected at a temperature of about 300° C. Isobutylene is recovered as the dehydrobromination product.

Before the hydrogen bromide capacity of the sorbent material is exceeded, the charge flow is stopped and bromine regenerated by passing air over the bromine combined with said sorbent material at about 300° C. Essentially quantitative recovery of bromine is effected.

*Example VI*

Methylcyclohexane and bromine are charged to a packed reactor in a mol ratio of about 10:1. The methylcyclohexane is charged to the reactor at a rate of about 100 cc. per hour, and bromine is charged at a rate of about 2265 cc. per hour in admixture with nitrogen charged at the rate of about 6240 cc. per hour. (STP.) Bromination is effected at a temperature ranging from 170° C. to 280° C. and at a pressure of about 1 atm. The effluent stream, continuously withdrawn from the reactor, and caustic scrubbed, comprises about 90% unreacted methylcyclohexane and about 10% methylcyclohexyl bromides.

The methylcyclohexyl bromides, separated from the unreacted methylcyclohexane, are charged to a second reactor containing therein about 50 cc. of a solid sorbent material comprising 5% copper, as copper oxide, on magnesia. The methylcyclohexyl bromides are charged at a liquid hourly space velocity of about 0.8 and dehydrobromination is effected at a temperature of about 150–240° C.

Before the hydrogen bromide capacity of the sorbent material is exceeded, the charge flow is stopped and bromine is regenerated by passing air over the bromine combined with said sorbent material at about 300° C. Essentially quantitative recovery of bromine is effected.

We claim as our invention:

1. A method of preparing an olefinic hydrocarbon from a more saturated hydrocarbon of the same carbon configuration as the desired olefinic hydrocarbon, which method comprises reacting bromine with said more saturated hydrocarbon and forming a bromine derivative thereof, dehydrobrominating the bromine derivative at an elevated temperature in contact with a solid sorbent material comprising an oxide of a metal selected from the group consisting of calcium, magnesium, and zinc, to convert said bromine derivative into an olefinic hydrocarbon and bromine and to combine the latter with said solid sorbent material, recovering the olefinic hydrocarbon and separating the bromine combined with said solid sorbent material by contacting the latter with an oxygen-containing gas at conditions effecting the oxidation of combined bromine.

2. A method of preparing a monoolefin from a saturated hydrocarbon of the same carbon configuration as the desired monoolefin which method comprises reacting bromine and said saturated hydrocarbon and forming a bromine derivative thereof and hydrogen bromide, separating the hydrogen bromide and treating the same as hereinafter described, dehydrobrominating the bromine derivative at an elevated temperature in contact with a solid sorbent material comprising an oxide of a metal selected from the group consisting of calcium, magnesium, and zinc, to convert said bromine derivative into a monoolefin and bromine and to combine the latter with said solid sorbent material, recovering the monoolefin and separating the bromine combined with said solid sorbent material by contacting the latter with an oxygen-containing gas at conditions effecting the oxidation of combined bromine, separately re-forming bromine from the first-mentioned hydrogen bromide by contacting the same with an oxygen-containing gas at conditions effecting the oxidation of combined bromine.

3. A method of preparing a cyclomonoolefin from a cyclic saturated hydrocarbon of the same carbon configuration as the desired cyclomonoolefin, which method comprises reacting bromine and said cyclic saturated hydrocarbon and forming a bromine derivative thereof and hydrogen bromide, separating the hydrogen bromide and treating the same as hereinafter described, dehydrobrominating the bromine derivative at an elevated temperature in contact with a solid sorbent material comprising an oxide of a metal selected from the group consisting of calcium, magnesium, and zinc, to convert said bromine derivative into a cyclomonoolefin and bromine and to combine the latter with said solid sorbent material, recovering the cyclomonoolefin and separating the bromine combined with said solid sorbent material by contacting the latter with an oxygen-containing gas at conditions effecting the oxidation of combined bromine, and separately recovering bromine from the first-mentioned hydrogen bromide by contacting the same with an oxygen-containing gas at conditions effecting the oxidation of combined bromine.

4. A method of preparing an olefinic hydrocarbon from a more saturated hydrocarbon of the same carbon configuration as the desired olefinic hydrocarbon, which method comprises reacting bromine with said more saturated hydrocarbon at a temperature of from about 0° C. to about 400° C. and forming a bromine derivative thereof, dehydrobrominating the bromine derivative at a temperature of from about 50° C. to about 550° C. in contact with a solid sorbent material comprising an oxide of a metal selected from the group consisting of calcium, magnesium, and zinc, and further comprising from about 0.1 wt. percent to about 15 wt. percent of a metal selected from the group consisting of copper, cerium, iron, nickel, and cobalt, to convert said bromine derivative into an olefinic hydrocarbon and bromine and to combine the latter with said solid sorbent material, recovering the olefinic hydrocarbon and separating the bromine combined with said solid sorbent material by contacting the latter with an oxygen-containing gas at a temperature of from about 50° C. to about 550° C., and supplying thus separated bromine to the first-mentioned step wherein bromine is reacted with said more saturated hydrocarbon.

5. A method of dehydrobrominating a brominated hydrocarbon and recovering free bromine which comprises contacting said brominated hydrocarbon with a solid sorbent material at a temperature of from about 50° C. to about 550° C., said sorbent material comprising an oxide of a metal selected from the group consisting of calcium, magnesium, and zinc, to convert said brominated hydrocarbon into an olefinic hydrocarbon and bromine and to combine the latter with said solid sorbent material and thereafter separating the bromine combined with said solid sorbent material by contacting the latter with an oxygen-containing gas at a temperature of from about 50° C. to about 550° C.

6. A method of dehydrobrominating a brominated hydrocarbon and recovering free bromine which comprises contacting said brominated hydrocarbon with a solid sorbent material at a temperature of from about 50° C. to about 550° C., said sorbent material comprising an oxide of a metal selected from the group consisting of calcium, magnesium, and zinc, and further comprising from about 0.1 wt. percent to about 15 wt. percent of a metal selected from the group consisting of copper, cerium, iron, nickel and cobalt, to convert said brominated hydrocarbon into an olefinic hydrocarbon and bromine and to combine the latter with said solid sorbent material and thereafter separating the bromine combined with said solid sorbent material by contacting the latter with oxygen-containing gas at a temperature or from about 50° C. to about 550° C.

7. A method of dehydrobrominating a brominated hydrocarbon and recovering free bromine which comprises contacting said brominated hydrocarbon at a temperature of from about 50° C. to about 550° C., with a solid sorbent material comprising magnesia and from about 0.1 wt. percent to about 15 wt. percent copper, to convert said brominated hydrocarbon into an olefinic hydrocarbon and bromine and to combine the latter with said solid sorbent material and thereafter separating the bromine combined with said solid sorbent material by contacting the latter with an oxygen-containing gas at a temperature of from about 50° C. to about 550° C.

8. A method of preparing propylene which comprises reacting bromine and propane at a temperature of from about 0° C. to about 400° C. and forming bromopropane and hydrogen bromide, separating the hydrogen bromide and treating the same as hereinafter described, dehydrobrominating the bromopropane at a temperature of from about 50° C. to about 400° C. in contact with a solid sorbent material comprising from about 1% to about 5% copper on magnesia, forming bromine combined with said solid sorbent material and propylene, recovering the propylene, re-forming bromine from the bromine combined with said solid sorbent material by contacting the same with air at a temperature of from about 50° C. to about 400° C., separately re-forming bromine from the first-mentioned hydrogen bromide by heating the same at a temperature of from about 50° C. to about 400° C. in contact with air, recovering the re-formed bromine and supplying the same to the first-mentioned reaction.

9. A method of preparing cyclohexane which comprises reacting bromine and cyclohexane at a temperature of from about 0° C. to about 400° C. and forming cyclohexyl bromide and hydrogen bromide, separating the hydrogen bromide and treating the same as hereinafter described, dehydrobrominating the cyclohexyl bromide at a temperature of from about 50° C. to about 400° C. in contact with a solid sorbent material comprising from about 1% to about 5% copper on magnesia, forming forming bromine from the first-mentioned hydrogen brocyclohexene, recovering the cyclohexene, re-forming bromine from the bromine combined with said solid sorbent material by contacting the same with air at a temperature of from about 50° C. to about 400° C., separately re-forming bromine from the first-mentioned hydrogen bromide by heating the same at a temperature of from about 50° C. to about 400° C. in contact with air, recovering the re-formed bromine and supplying the same to the first-mentioned reaction.

10. A method of preparing isoprene which comprises reacting bromine and isopentene at a temperature of from about 0° C. to about 50° C. and forming a dibromo derivative of said isopentene, dehydrobrominating the dibromo derivative at a temperature of from about 200° C. to about 550° C. in contact with a solid sorbent material comprising from about 1% to about 5% copper on magnesia, forming bromine combined with said solid sorbent material and isoprene, recovering the isoprene, re-forming bromine from the bromine combined with said solid sorbent material by contacting the same with air at a temperature of from about 50° C. to about 400° C., recovering the reformed bromine and supplying the same to the first-mentioned reaction.

11. A method of preparing isobutylene which comprises reacting bromine and isobutane at a temperature of from about 0° C. to about 250° C. and forming isobutyl bromide and hydrogen bromide, separating the hydrogen bromide and treating the same as hereinafter described, dehydrobrominating the isobutyl bromide at a temperature of from about 50° C. to about 400° C. in contact with a solid sorbent material comprising from about 1% to about 5% copper on magnesia, forming bromine combined with said solid sorbent material and isobutylene, recovering the isobutylene, re-forming bromine from the bromine combined with said solid sorbent material by contacting the same with air at a temperature of from about 50° C. to about 400° C., separately re-forming bromine from the first-mentioned hydrogen by heating the same at a temperature of about 50° C. to about 400° C. in contact with air, recovering the re-formed bromine and supplying the same to the first-mentioned reaction.

12. A method of preparing methylcyclohexene which comprises reacting bromine and methylcyclohexane at a temperature of from about 0° C. to about 400° C. and forming methylcyclohexyl bromide and hydrogen bromide, separating the hydrogen bromide and treating the same as hereinafter described, dehydrobrominating the methylcyclohexyl bromide at a temperature of from about 50° C. to about 400° C. in contact with a solid sorbent material comprising from about 1% to about 5% copper on magnesia, forming bromine combined with said solid sorbent material and methylcyclohexene recovering the methylcyclohexene, re-forming bromine from the bromine combined with said solid sorbent material by contacting the same with air at a temperature of about 50° C. to about 400° C., separately reforming bromine from the first-mentioned hydrogen bromide by heating the same at a temperature of about 50° C. to about 400° C. in contact with air, recovering the re-formed bromine and supplying the same to the first-mentioned reaction.

References Cited by the Examiner

UNITED STATES PATENTS

| | | | |
|---|---|---|---|
| 2,490,973 | 12/1949 | Leonard | 260—666 |
| 2,504,919 | 4/1950 | Bordner | 260—677 |
| 2,613,233 | 10/1952 | Blumer | 260—683 X |
| 2,867,671 | 1/1959 | Mullineaux et al. | 260—666 |
| 2,971,995 | 2/1961 | Arganbright | 260—683.3 |
| 3,106,590 | 10/1963 | Bittner | 260—666 |
| 3,119,881 | 1/1964 | Hodgson | 260—254 |
| 3,130,241 | 4/1964 | Baijle | 260—677 |

DELBERT E. GANTZ, *Primary Examiner.*

ALPHONSO D. SULLIVAN, PAUL M. COUGHLAN,
*Examiners.*